United States Patent [19]
Lindquist et al.

[11] Patent Number: 5,852,660
[45] Date of Patent: *Dec. 22, 1998

[54] NETWORK PROTOCOL CONVERSION MODULE WITHIN A TELECOMMUNICATIONS SYSTEM

[75] Inventors: Jan Lindquist, Aachen, Germany; Charles M. Feltner, Plano, Tex.

[73] Assignee: Ericsson Inc., Research Triangle Park, N.C.

[ * ] Notice: The term of this patent shall not extend beyond the expiration date of Pat. No. 5,838,782.

[21] Appl. No.: 630,355

[22] Filed: Apr. 10, 1996

[51] Int. Cl.$^6$ .............................. H04M 7/00; H04M 3/42; H04J 3/02; H04J 3/12
[52] U.S. Cl. .......................... 379/230; 370/401; 370/467; 379/207; 379/219
[58] Field of Search .............................. 379/34, 207, 219, 379/220, 221, 229, 230; 370/401, 466, 467

[56] References Cited

U.S. PATENT DOCUMENTS

| | | | |
|---|---|---|---|
| 5,239,542 | 8/1993 | Breidenstein et al. | 370/376 |
| 5,278,823 | 1/1994 | Handel | 370/401 X |
| 5,282,244 | 1/1994 | Fuller et al. | 379/230 |
| 5,420,916 | 5/1995 | Sekiguchi | 379/230 |
| 5,550,914 | 8/1996 | Clarke et al. | 379/229 X |

FOREIGN PATENT DOCUMENTS

| | | |
|---|---|---|
| 0 203 614 | 12/1986 | European Pat. Off. . |
| 0 645 939 A2 | 9/1994 | European Pat. Off. . |
| 0 669 771 | 8/1995 | European Pat. Off. . |

OTHER PUBLICATIONS

Fergus, J.E., "Signaling Network Interconnection", vol. 41, No. 1, 1987, pp. 560–562.

Bijan, Jabbari, "Routing and Congestion Control in Common Channel Signaling System No. 7", vol. 80, No. 4, Apr. 1, 1992, pp. 607–617.

El–Toumi, A.A., et al., "Interconnecting SS7 Signaling Networks", vol. 2 of 4, Apr. 15, 1990, pp. 589–593.

*Primary Examiner*—Harry S. Hong
*Attorney, Agent, or Firm*—Jenkens & Gilchrist

[57] ABSTRACT

Signaling Connection Control Part (SCCP) parameters within a signal generated within a first SS7 telecommunications network are converted into values and formats acceptable by a second SS7 telecommunications network by a converter residing within a gateway Signal Transfer Point (STP). Such a converter enables signals containing application layer data to be transported across two different SS7 telecommunications networks that are otherwise incompatible.

24 Claims, 6 Drawing Sheets

NETWORK PROTOCOL CONVERSION MODULE WITHIN A TELECOMMUNICATIONS SYSTEM

BACKGROUND OF THE INVENTION

1. Technical Field of the Invention

The present invention relates to the communication of application layer signals across different telecommunications networks and, in particular, to the conversion application layer signals between a first Signaling System No. 7 (SS7) telecommunications network and a second SS7 telecommunications network, wherein the first and second SS7 telecommunications network are incompatible.

2. Description of Related Art

A typical telecommunications exchange is a complex digital processor comprising a vast number of devices, signal terminals and, most importantly, software and hardware modules for providing telecommunications services to telecommunications users. With the development of the aforementioned digital processor and a Common Channel Signaling (CCS) network system, a typical telecommunications exchange is now able to support and transport much more than mere voice data. Such data might include video images, control signals, or application specific information. An example of such application specific information might be credit card validation data communicated over an existing telecommunications network to verify a customer's credit card number.

In order for two or more telecommunications exchanges to properly exchange data amongst each other, all parties to a "conversation" must agree to a specific communications protocol. The protocol must be strictly followed by each party to timely and correctly deliver data to the right place and to communicate recognizable data to end users engaged in a conversation or session over a network or series of networks. Consequently, in the modern telecommunications industry, standard communications systems are linked to each other using protocols based on the Open Systems Interconnections (OSI) model.

The OSI model is the only internationally accepted framework of standards for communicating between different systems made by different vendors. The goal of OSI is to create an open system networking environment where any vendor's computer system, connected to any network, can freely share data with any other computer system on that network. However, the fact that a system is "open" does not imply a particular protocol or specification. Rather, OSI provides a conceptual and functional framework which allows and supports users to develop their own telecommunications specifications to conform to more high level OSI layers. The most widely accepted OSI standard for telecommunications communications has been Common Channel Signaling (CCS). Particularly, the most commonly used technology for implementing CCS in the United States has been the Signaling System No. 7 (SS7). It should be noted however that even within the same SS7 telecommunications protocol, there are different implementations for different networks.

The United States utilizes the SS7 protocol that has been developed by the American National Standards Institute (ANSI). European countries, on the other hand, utilize the SS7 protocol that has been developed by the Consultative Committee On International Telephone & Telephony (CCITT). One difference between the two protocols resides in the data structures and addressing mechanisms utilized by their respective Signaling Connection Control Parts (SCCP).

Because of such differences, application modules utilizing Transaction Capabilities Application Part (TCAP) messages cannot transport TCAP messages from an ANSI based SS7 network to a CCITT based SS7 network. For example, because of the above incompatibility, an American credit card user in Europe would not be able to validate his credit card by communicating his credit card information from Europe to his bank in the United States.

Another example is the use of CLASS 7 special subscriber features, such as a Class Automatic Callback (CAC), across different telecommunications networks. According to the CAC feature, each time a first subscriber makes an outgoing call toward a second subscriber, the destination telephone number of the second subscriber is stored in a database maintained by the first local exchange servicing the first subscriber. Should the first subscriber wish to call back the second subscriber after the termination of the initial connection, the first subscriber can merely dial a service code. Upon receipt of the service code, the first local exchange retrieves the stored outgoing telephone number and initiates a new call setup. However, if the second subscriber is already busy, the second local exchange servicing the second subscriber queues the call setup request and monitors the busy line. Once the line becomes idle, the second local exchange sends a TCAP message to the first local exchange informing of the second subscriber's availability. The first local exchange then alerts (rings) the first subscriber back and also initiates a new call setup toward the second subscriber. Accordingly, if the called subscriber is busy, the telecommunications system automatically monitors the line until it becomes idle and immediately sets up a new call between the two subscribers. This is convenient for subscribers because they do not have to repeatedly dial the called party until a connection is established. Such Class features do not work across different telecommunications networks, such as from the U.S. network to the European network, because TCAP messages cannot be transported between an ANSI based network and a CCITT based network to control feature activation.

Accordingly, it would be advantageous to provide a conversion system to enable compatible communication between an ANSI SS7 network and a CCITT SS7 network. Such conversion would advantageously enable an application module residing within an ANSI SS7 network to communicate TCAP messages or other application layer data to another application module residing within a CCITT SS7 network.

SUMMARY OF THE INVENTION

The present invention provides a method and apparatus for enabling telecommunications signals containing application layer data generated by a first SS7 telecommunications network to be transported across a second SS7 telecommunications network, wherein the first SS7 telecommunications network and the second SS7 telecommunications network are incompatible.

In one aspect, the present invention provides a method and apparatus for converting application layer signals between an American National Standards Institute (ANSI) based SS7 telecommunications network and a Consultative Committee on International Telegraph and Telephone (CCITT) based SS7 telecommunications network.

In another aspect, the present invention provides a method and apparatus for converting Signaling Connection Control Part (SCCP) parameters between ANSI based SS7 telecommunications network and CCITT based SS7 telecommunications network.

In yet another aspect, the present invention provides a method and apparatus for routing a return message back from the CCITT based SS7 telecommunications network to the ANSI based SS7 telecommunications network in response to a signal transmitted from the ANSI based SS7 telecommunications network to the CCITT based SS7 telecommunications network.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
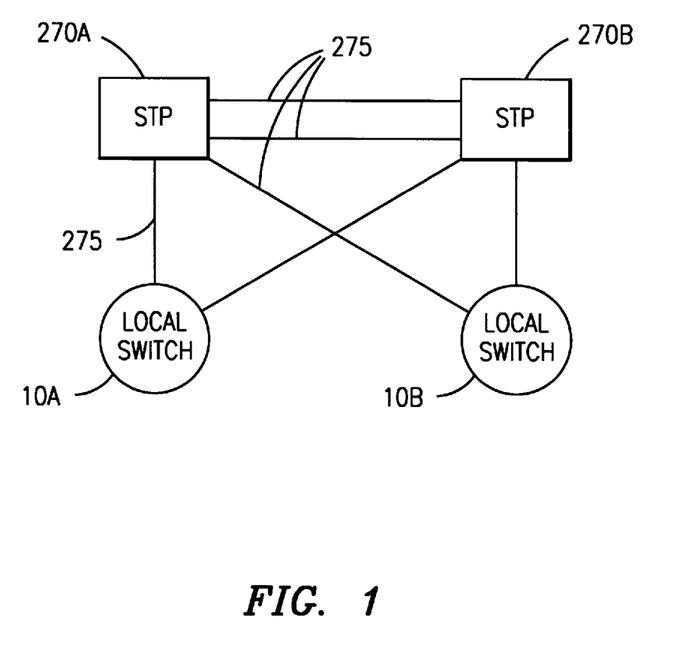
FIG. 1 is a block diagram illustrating a typical Signaling System No. 7 (SS7) telecommunications network.

FIG. 1 is a diagram representing a section of a typical Signaling System No. 7 telecommunications network in which the present invention, as will be disclosed herein, may be implemented. With the advent of digital switching, Common Channel Signaling (CCS) has rapidly become the preferred way of handling the connection of calls in circuit-switched networks. The most commonly used technology for implementing CCS in the U.S. has been the Signaling System No. 7 (SS7) initially created by the Consultative Committee on International Telephone & Telegraph (CCITT) and later modified by the American National Standards Institute (ANSI). To carry out the routing and signaling functions within the network, messages must be sent via the packet-switched signaling network from a local exchange A 10A to a local exchange B 10B. Dual Signal Transfer Points (STPs) 270A and 270B are designed to provide reliable transfer of signaling messages by always providing more than one signal links 275 between any two nodes. These signals containing application layer data are transported within a network or series of networks without establishing a physical connection between an origination node and a destination node (node comprises a local exchange, database, or any other signal generating elements connected to a telecommunications network). Unlike the channel carrying voice or video data, each separate packet is individually and separately routed toward the intended node.

Accordingly, each signal includes origination and destination addresses which direct the STPs to correctly deliver the packet to the destination node. Data required by application-layer modules, such as credit card validation procedures or the Class Automatic Callback feature, are encapsulated into Transaction Capable Application Part (TCAP) message signals or other application layer signals and transported from one node in the network toward another node in the network. More specifically, Signaling Connection Control Part parameters within each signal header are filled with the necessary origination and destination addresses to enable the signal to travel across a network or a series of networks.

CCS SS7 is the most widely used telecommunications network in the world. But, there are a number of different variations even among the CCS SS7 standard. For example, the U.S. follows the American National Standard Institute (ANSI) based SS7 standard; whereas, European countries follow the Consultative Committee on International Telephone & Telephony (CCITT) based SS7 standard. One of the differences that exists between the ANSI SS7 standard and the CCITT SS7 standard is the different addressing format and mechanism being utilized by the aforementioned SCCP parameters. Furthermore, different address labels and data are used by the two standards preventing communication and transportation of application layer signals from one ANSI based SS7 network to another CCITT based SS7 network.

Figure 2:
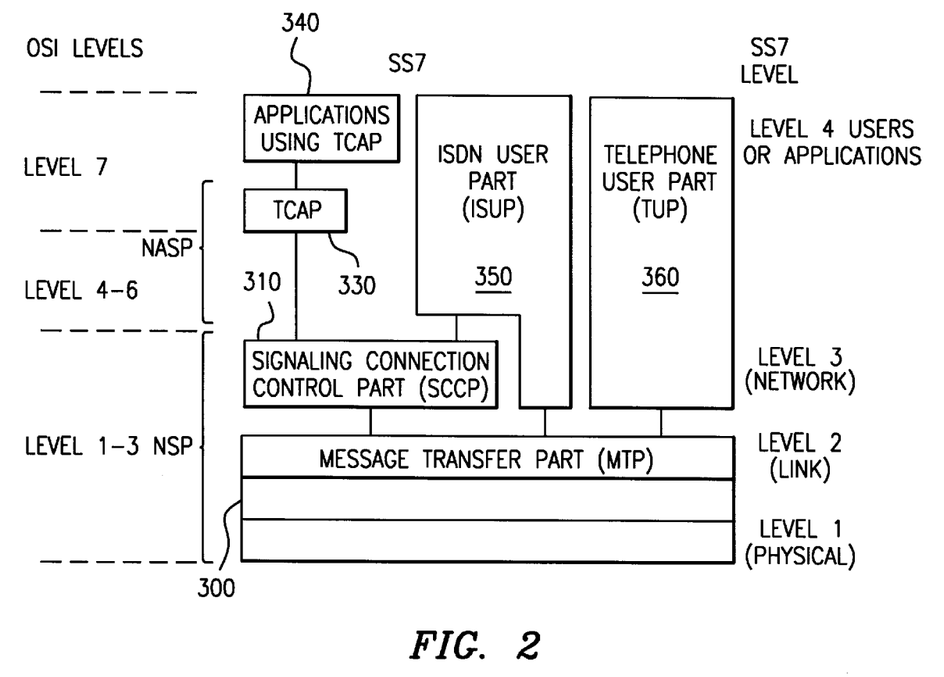
FIG. 2 is a block diagram illustrating the different layers within the SS7 telecommunications system.

FIG. 2 is a block diagram illustrating the different layers within a typical SS7 telecommunications system. In accordance with the layer architecture of the Open System Interface, an SS7 telecommunications system is also layered into multiple system layers. Basically, SS7 has two parts, a user part and a message transfer part. The message transfer part (MTP) 300 is the lowest layer of the SS7 network system and is used to transport data physically from one point to another point in the network. The user part comes in several varieties. Examples of such user parts include a Telephone User Part (TUP) 360 for basic telephone service, and an Integrated Service Digital Network (ISDN) User Part (ISUP) 350 for combined voice, data and voice services. These user parts also utilize the MTP 300 to provide a connection-less but sequenced transport service. Applications 340 residing at the very highest layer of an SS7 network utilize the Transaction Capabilities Application Part (TCAP) layer 330, and the Signaling Connection Control Part (SCCP) layer 310 to transport application layer data from one application to another application via MTP 300. Applications can further utilize their own proprietary message signals to interface directly with the SCCP layer 310 to communicate application layer data from one application to another application.

The purpose of the SCCP 310 is to provide the means for end-to-end routing. Accordingly, SCCP 310 processes the specified address within a particular signal to properly deliver the data to the specified destination. This addressing information is used at each signaling point, such as a Signaling Transfer Point (STP), by the MTP 300 to determine which communication link to use. Within the addressing information required by SCCP 310, there are basically two types of addresses: called party address and calling party address. Usually called/calling party addresses are digits dialed by the user. When the initial exchange or signaling point code (SPC) does not know the point code or the subsystem number of the destination node, global title digits have to be used by SCCP for routing. At some point, the point code and subsystem number have to be provided so the message can reach its final destination. This function is known as global title translation, and is usually provided by the STP adjacent to the destination node.

Figure 3:
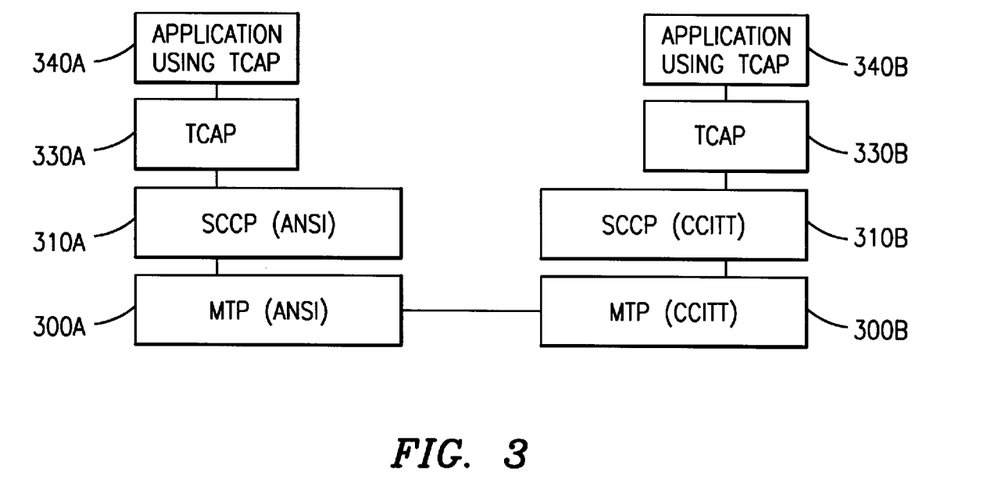
FIG. 3 is a block diagram illustrating an incompatible ANSI based and CCITT based telecommunications networks.

Referring now to FIG. 3, there is shown a block diagram illustrating an incompatibility that exists between an ANSI based SS7 telecommunications network and a CCITT based SS7 telecommunications network. An application module 340A connected to an ANSI based SS7 telecommunications network transmits a signal containing application layer data to its TCAP layer 330A. The TCAP layer 330A for the ANSI network, in turn, interfaces the signal with its ANSI SCCP layer 310A. The ANSI SCCP layer 310A loads the signal onto the physical medium provided by the MTP layer 300A and tries to transport the data over to the CCITT network. Even though the application layer 340B and the TCAP layer 330B connected to the CCITT SS7 network are compatible with the corresponding ANSI SS7 network layers, because of the inconsistency that exists between the SCCP parameters, the SCCP serving one network is not able to recognize and interpret the called/calling party addresses received from the other network. Consequently, application layer data which are otherwise compatible are not capable of being transported across the two networks.

Figure 4:
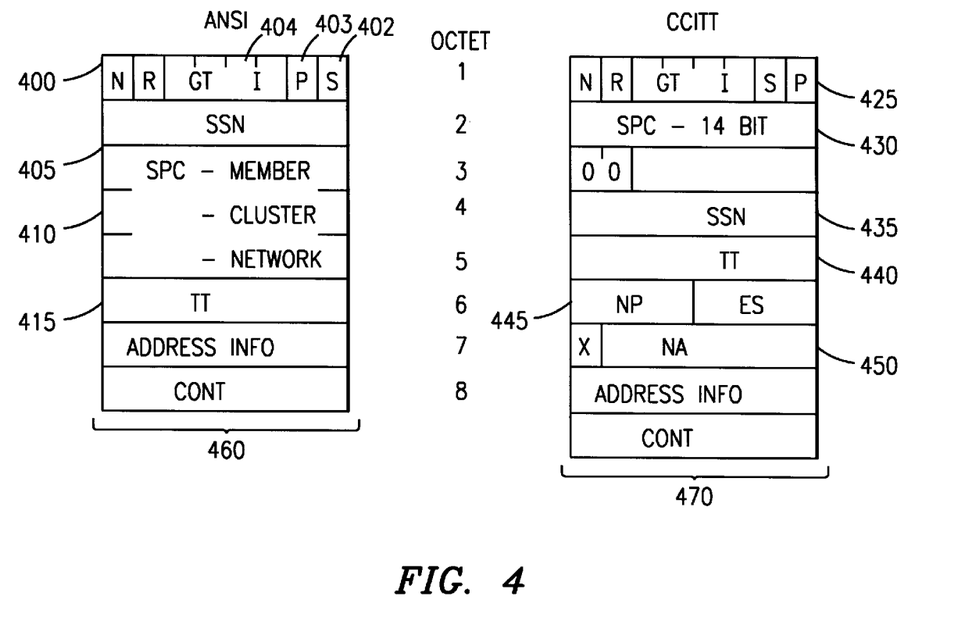
FIG. 4 is a block diagram illustrating the different addressing data structures for ANSI and CCITT based SS7 telecommunications systems.

Referring is now made to FIG. 4 wherein this inconsistency is illustrated with specific reference to the ANSI and CCITT SCCP parameter structures. The ANSI SCCP parameter data structure 460 illustrates the format and the types of data that are required for the Called Party Address and Calling Party Address to properly route and return signals within an ANSI SS7 telecommunications network. The address indicator 400 specifies data for which portion of the SCCP parameters are specified within a particular signal. For example, the S bit 402 specifies whether subsystem number (SSN) data have been provided at the SSN data portion 405. An SSN number is usually assigned to an application module such as a database or special subscriber features within an SS7 network. On the other hand, a Signaling Point Code (SPC) is assigned to a switching node within an SS7 network. Likewise, the P bit 403 specifies whether SPC data have been provided at the SPC data portion 410. The global title indicator (GT I) bit 404 also specifies the format of the Global Title information stored at the data portion 415. The remainder of the headers are loaded with the actual data that have been flagged as being provided for by the above address indicator 400. Accordingly, the second octet stores the SSN data. The third, fourth, and fifth octets store the number, cluster and network code of the SPC data, respectively. Lastly, the sixth octet stores the TT data.

Similarly, with the CCITT standard 470, the address indicator 425 occupies the first octet of the SCCP parameter. The second and third octets store the SPC data 430. The fourth octet is occupied with the SSN data 435. The fifth octet is occupied with the TT data 440. A half of the sixth octet is for storing the number plan (NP) data 445. Lastly, the seventh octet is used to store the Nature of Address Indicator (NA) data 450.

These called/calling party addresses represented using the above SCCP parameters are necessary for routing and communicating application layer data between the two nodes. However, as illustrated above, the data structure for representing called/calling party addresses for the ANSI standard is incompatible with the CCITT standard data structure. When a signal formatted with the ANSI standard is transported to a CCITT based SS7 telecommunications network, because of such SCCP parameter differences, the CCITT SS7 network cannot recognize and properly route the received signal. Accordingly, in order to enable ANSI based SCCP parameters to be recognizable by a CCITT based SS7 network, the data format as well as the data values must be converted.

Figure 5:
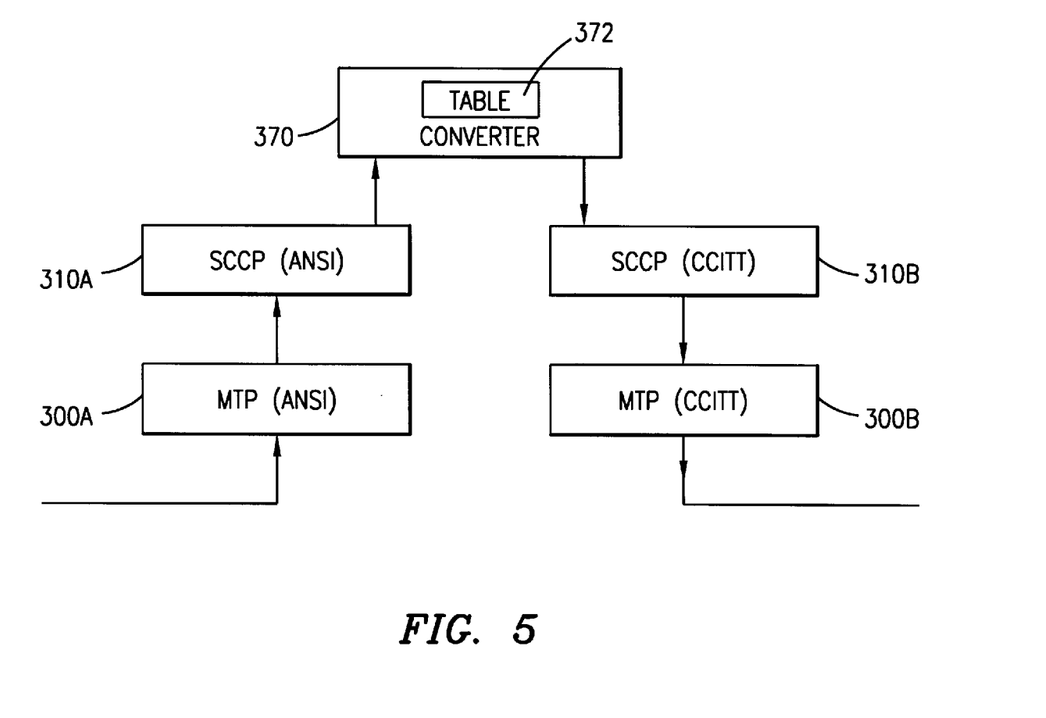
FIG. 5 is a block diagram illustrating a converter interfacing with a Signaling Connection Control Part (SCCP) module for converting signals between ANSI and CCITT based SS7 telecommunications systems.

In accordance with the teachings of the present invention, SCCP parameters received from one network standard are reformatted and converted to be compatible with the other network standard. This enables the SCCP layer associated with the other network to recognize and reroute signals containing application layer data to their intended destination nodes. FIG. 5 illustrates the use of an ANSI-CCITT converter 370 to interface with the SCCP layers 310 for receiving and converting SCCP parameters. In order to circumvent the above incompatibility problem, an originating node could include a converter which transforms the outgoing SCCP parameters to be compatible with the destination network. However, such an implementation is only allowed if the originating node already knows what standard the destination node is following. Moreover, if there are STPs utilizing different protocols than the one specified in the SCCP parameter in between the originating and the destination nodes, the routing also fails. Therefore, an independent converter with a conversion table is provided at each point where the ANSI SS7 network and the CCITT SS7 network interface.

The ANSI MTP layer 300A physically transports signals from the ANSI SS7 network and interfaces with the ANSI SCCP module 310A. The ANSI SCCP module 310A retrieves the signals from the MTP layer 300A and forwards them to the converter 370. The converter 370, in response to the dynamic values stored in its conversion table or register 372, accordingly changes SCCP parameters specified by the originating node to be compatible with the appropriate destination network. The signals with the converted SCCP parameters and still containing the same application layer data are then transmitted to the destination network to be delivered to the destination application user node. Accordingly, the converted signals are interfaced with the destination CCITT SCCP module 310B. The CCITT SCCP module 310B in turn interfaces the signals with the CCITT MTP layer 300B for physical transportation to the destination node.

During the overall conversion and interface process, only the SCCP layer data within the signal header are manipulated by the converter, and all other layer data including TCAP data are transported transparently through the converter.

Figure 6:
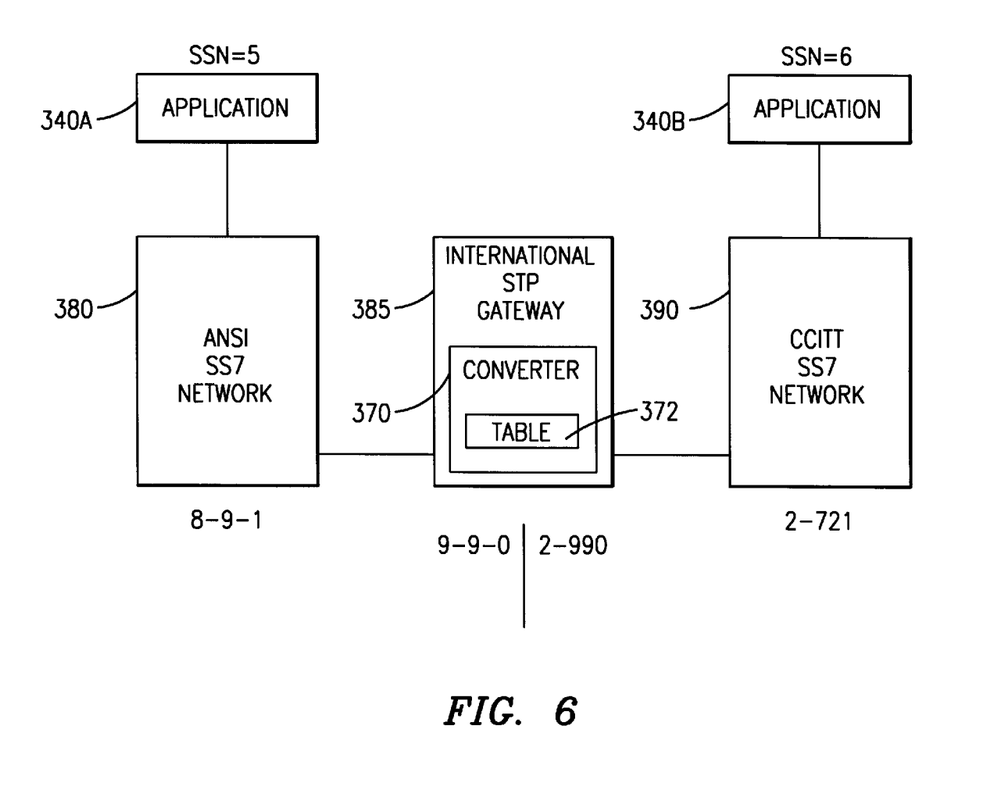
FIG. 6 is a block diagram illustrating a gateway Signal Transfer Point (STP) converting signals between ANSI and CCITT based telecommunications networks.

FIG. 6 is an exemplary embodiment of the present invention. A gateway STP 385 is typically used to connect a first national network with a second national network. For example, the gateway STP 385 connects the ANSI SS7 network of the United States 380 with the CCITT SS7 network of Europe 390 to provide telecommunications service to subscribers across both continents. For normal telephone service, including call setup and voice data communication, no converter is needed. For normal telephone connections, signals such as ISUP or TUP do not require SCCP parameters. However, application layer data encapsulated in a signal utilizing SCCP parameters are intercepted and converted by the converter 370 residing within the gateway STP 385. As a result, an application module 340A connected to the ANSI SS7 network 380 can communicate application layer data with an application module 340B connected to the CCITT SS7 network 390. No call connection has to be maintained between the application module 340A and the application module 340B. By utilizing the connection-less type setup, signals containing application layer data can be transported between the two application modules to provide advanced subscriber features and capabilities to end users.

The converter module 370 residing within the gateway STP 385 performs three functions: it reformats the SCCP parameters to conform to the specification mandated by the destination standard; it converts the SCCP parameter values to be recognizable by the destination SS7 network; and it further provides additional SCCP parameter values to enable proper delivery of a return message back to the original sender. Accordingly, the converter module 370 references a conversion table 372 storing SCCP parameter values and their cross referencing pointers to achieve the aforementioned tasks. An exemplary conversion table or register 372 comprises:

TABLE 1

| STANDARD LABEL | SCCP PARAMETER & VALUES |
|---|---|
| ANSI 1 | TT = 3 |
| ANSI 2 | SPC = 8-9-1 |
|  | SSN = 5 |
| CCITT 1 | TT = 0 |
|  | NP = 7 |
|  | NA = 4 |
| CCITT 2 | SPC = 2-990 |
|  | SSN = 20 |
|  | TT = 0 |
|  | NP = 5 |
|  | NA = 4 |
|  | GTS = 008009001 |

Using the above entries, ANSI SCCP parameter values are further cross referenced and converted into corresponding CCITT SCCP parameter values in accordance with Table 2:

TABLE 2

| ANSI | CCITT |
|---|---|
| ANSI 1 | CCITT 1 |
| ANSI 2 | CCITT 2 |

In FIG. 6, an application module 340A having an SSN value of 5 originates a message while being connected to a node with an SPC value of 8-9-1 within the ANSI SS7 network 380. Accordingly, the calling party address (Cgpa) is SPC=8-9-1, and SSN=5 for the application module 340A. A user inputted called party address (Cdpa) also needs to be specified by the SCCP parameters to show, for example: TT=3; and GTS=05511 . . . . Once the signal containing the above Cgpa and Cdpa SCCP parameters are received by the gateway STP 385, the converter 370 converts the above received Cdpa and Cgpa to the appropriate CCITT formatted values.

For the Cdpa SCCP parameter values, since TT=3 corresponds to the ANSI 1 label, it is converted in accordance with the CCITT 1 label as specified in Table 2. Translation Title (TT) 3 in the ANSI standard implies that this particular Cdpa is a Cellular Nationwide Roaming Service Number. Even though the U.S. and Europe utilize different SCCP specifications, the Global System for Mobile communication (GSM) standard in the United States uses the same CCITT TCAP as the GSM from Europe. Accordingly, GTS value need not be modified and is transported to the CCITT network unchanged. Only TT, NA, and NP values are modified or added to the SCCP parameters to properly notify the CCITT network that this particular signal has a translation type of Cellular Nationwide Roaming Service Number. Accordingly, using Tables 1 and 2, the above SCCP Cdpa parameter values are converted to:

Cdpa
TT=0
NP=7
NA=4
GTS=05511 . . .

The above converted SCCP parameters are further formatted to correspond to the data syntax 470 illustrated in FIG. 4. As a result, the converted signal containing application layer data is now transportable across the CCITT SS7 network.

Not all SS7 applications route messages based on GTS values. A message routed using SSN and SPC values is transportable to the gateway STP 385 connecting the two SS7 networks together. However, since the message received by the converter 370 is not routed using a GTS value, the GTS parameter is not present in Cdpa for routing purposes. Without the GTS value, the converter 370 is not able to forward the received message to the appropriate node in the other network. Therefore, in accordance with the teachings of the present invention, if an SS7 application module transmits a message using SPC and SSN values, an appropriate GTS value needs to be included in the Cdpa of the transmitted message and transported to the gateway STP 385. Once the signal is received by the gateway STP 385, the converter 370 extracts the included GTS value and utilizes the extracted GTS value as the SCCP Cdpa parameter for routing the message to the other network.

The SCCP Cgpa parameter, on the other hand, is not utilized by the CCITT SS7 network to deliver this particular signal to the application module 340B. However, if the application module 340B subsequently wishes to return a message back to the application module 340A, the enclosed Cgpa address is used as the Cdpa for the return signal. However, in converting the Cgpa address, for purposes of facilitating the proper delivery of a result message back to the ANSI SS7 network 380 from the CCITT SS7 network 290, a mere conversion of an ANSI based address to a CCITT Based address is inadequate. Even if the conversion table 372 formats SSN=5 and SPC=8-9-1 representing the calling party node 340A to be in conformity with the CCITT standard, these address are not physically defined in the CCITT SS7 network 390. Consequently, the CCITT SS7 network will not be able to handle or route the return signal. As a result, a separate addressing mechanism is required to transport the return message back to the gateway STP 385 from the CCITT SS7 network 390.

While transmitting a signal from the gateway STP 385 to the CCITT SS7 network 390, instead of transmitting the ANSI SS7 network address representing the application module 340A, the CCITT SS7 network address representing the gateway STP 385 is transmitted as the Cgpa address. If the application module 340B later wishes to transmit a return signal back to the application module 340A, the received network address representing the gateway STP 385 is utilized as the Cdpa. By utilizing this particular network address, the return message is properly delivered to the gateway STP 385 by the CCITT SS7 network. Once the return signal reaches the gateway STP 385, the gateway STP 385 replaces the Cdpa with the original ANSI SS7 network address representing the application module 340A. For the gateway STP 385 to reroute the return message, it needs the original ANSI SS7 network address representing the application module 340A when the return signal is received from the CCITT SS7 network. However, in order to avoid storing this address internally within the gateway STP 385, the ANSI SS7 network address representing the application module 340A is "piggy-backed" onto the original message when transmitted to the CCITT SS7 network 390. When the decision is made to transmit a return signal, the same ANSI SS7 network address is returned to the gateway STP 395 by "piggy-backed" onto the transmitted return signal.

As an example, when transmitting the first signal from the gateway STP 385 to the CCITT SS7 network 390, the ANSI SS7 network address representing the application module 340A is contained in optional fields not utilized by the CCITT SS7 network 390. As described previously, the Cgpa field is stored with the CCITT SS7 network address representing the gateway STP. Once the first signal is received, the application module 340B extracts the Cgpa value and transmits the return signal with the extracted value as the Cdpa. The optional fields are further transmitted without modification by the application module 340B. The return message is accordingly delivered to the gateway STP 385 as indicated by the specified Cdpa. After receiving the return signal, the gateway STP 385 extracts the ANSI SS7 network address from the optional fields of the return signal and, in turn, properly reroutes it to the intended application module 340A.

While transmitting the first signal to the CCITT SS7 network 390, the gateway STP network address is represented via SPC and SSN. In order to instruct the CCITT SS7 network 390 to use the SSN and SPC fields for routing purposes, an appropriate bit within the address indicator 425 as illustrated in FIG. 4 is marked. As a result, the TT, NP, NA, and GTS fields are ignored and not utilized by the network. These ignored or optional fields are utilized by the gateway STP 385 to "piggy-back" the ANSI SS7 network address representing the application module 340A to and from the CCITT SS7 network 390.

Accordingly, using Tables 1 and 2, the Cgpa parameter values for the first signal are converted to Cgpa
SPC=2-990
SSN=20
TT=0, NP=5, NA=4,
GTS=008009001

As described above, SPC=2-990 represents the CCITT SS7 network address for the gateway STP 385. The optional fields (TT, NP, NA, and GTS) contain the network address representing the original ANSI SS7 application module 340A.

Subsequently, when the application module 340B with an SSN value of 6 connected to a node having an SPC value of 2-721 within the CCITT SS7 network 390 returns a signal back to the application module 340A, the following SCCP Cdpa and Cgpa parameters are again received by the gateway STP 385:

Cdpa
SPC=2-990
SSN=20
TT=0, NP=5, NA=4
GTS=008009001
Cgpa
TT=0
NP=7
NA=4
GTS=05511 . . .

As illustrated above, the Cgpa value for the previously transmitted signal is now the Cdpa value for the return signal.

The CCITT SS7 network 390 utilized the SPC=2-990 value to properly deliver the signal to the gateway STP 385. Once the data are received, the gateway STP 385 extracts the intended application module's network address from the optional fields (TT, NP, NA, and GTS) and properly reformats GTS=008009001 to SPC=8-9-1 by utilizing Tables 1 and 2:

Cdpa
SPC=8-9-1
SSN=5

Now the reformatted ANSI network address enables the gateway STP 385 to route the return signal back to the application module 340A via the ANSI SS7 network 380.

Even though only a few of the SCCP parameters are illustrated above for exemplary purposes, any one or combination of the following ANSI SCCP parameters can be converted from and to the following CCITT SCCP parameters:

| ANSI SS7 | CCITT SS7 |
| --- | --- |
| SSN | SSN |
| SSN, SPC | SSN, SPC |
| TT | TT, NP |
| TT, GTS | TT, NP, NA |
| | TT, NP, GTS |

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A system for communicating a signal containing application layer data between a first American National Standards Institute (ANSI) based Signaling System No. 7 (SS7) network and a second Consultative Committee on International Telegraph and Telephone (CCITT) based SS7 network, said system comprising:

a gateway Signal Transfer Point (STP) connecting said first SS7 network with said second SS7 network, said gateway STP comprising:

a Signaling Connection Control Part (SCCP) layer module; and         a conversion module interfaced with said SCCP layer module, said conversion module:

receiving said signal from one of said SS7 networks; and             converting SCCP parameter addressing data within said signal received from said one of said SS7 network between ANSI protocol and CCITT protocol in order to be recognizable by the other SS7 network.

2. The system of claim 1 wherein said conversion module converts between SCCP parameters recognizable by said ANSI based SS7 telecommunications network and SCCP parameters recognizable by said CCITT based SS7 telecommunications network.

3. The system of claim 2 wherein said SCCP parameters received from said ANSI based SS7 telecommunications network that are convertible by said conversion module are selected from a group of:

a Subsystem Number (SSN);

a Signaling Point Code (SPC);

a Translation Type (TT);

a Global Title Series (GTS); or combination thereof.

4. The system of claim 2 wherein said SCCP parameters received from said CCITT based SS7 telecommunications network that are convertible by said conversion module are selected from a group of:

a Subsystem Number (SSN);

a Signaling Point Code (SPC);

a Translation Type (TT);

a Numbering Plan (NP);

a Nature of Address indicator (NA);

a Global Title Series (GTS); or combination thereof.

5. The system of claim 1 wherein said conversion module converts between a Translation Type (TT) and Global Title Series (GTS) values recognizable by said ANSI based SS7 telecommunications network and a TT, Numbering Plan (NP), Nature of Address indicator (NA), and GTS values recognizable by said CCITT based SS7 telecommunications network.

6. The system of claim 1 wherein said conversion module converts between a Signaling Point Code (SPC) and Subsystem Number (SSN) values recognizable by said ANSI based SS7 telecommunications network and a TT, Numbering Plan (NP), Nature of Address indicator (NA), and GTS values recognizable by said CCITT based SS7 telecommunications network.

7. The system of claim 1 wherein said conversion module further comprises a register for storing values for translating between said SCCP parameter values recognizable by said ANSI based SS7 telecommunications network and SCCP parameter values recognizable by said CCITT based SS7 telecommunications network.

8. The system of claim 1 wherein said conversion module reformats between said SCCP parameters recognizable by said ANSI based SS7 telecommunications network and said SCCP parameters recognizable by said CCITT based SS7 telecommunications network.

9. The system of claim 1 wherein said signal includes a Calling Party Address (Cgpa) parameter containing a Cgpa value and wherein said conversion module further comprises means for:

copying said Cgpa value into one of said SCCP parameters; and replacing said Cgpa parameter with a network address representing said gateway STP.

10. A system for converting Signaling Connection Control Part (SCCP) parameters within a signal to transport said signal between a first American National Standards Institute (ANSI) based Signaling System No. 7 (SS7) network and a second Consultative Committee on International Telegraph and Telephone (CCITT) based SS7 network, said system comprising:

a Message Transfer Part module for receiving said signal from one of said SS7 networks;

a SCCP module interfaced with said MTP module for retrieving said signal; and a conversion module interfaced with said SCCP module for converting said SCCP parameter within said signal received from said one of said SS7 networks between ANSI parameters and CCITT parameters in order to be recognizable by the other SS7 network.

11. The system of claim 10 wherein said conversion module converts between a Translation Type (TT) and Global Title Series (GTS) values recognizable by said ANSI based SS7 network and a TT, Numbering Plan (NP), Nature of Address indicator (NA), and GTS values recognizable by said CCITT based SS7 network.

12. The system of claim 10 wherein said conversion module converts between a Signaling Point Code (SPC) and Subsystem Number (SSN) values recognizable by said ANSI based SS7 network and a TT, Numbering Plan (NP), Nature of Address indicator (NA), and GTS values recognizable by said CCITT based SS7 network.

13. The system of claim 10 wherein said conversion module comprises a register for storing values for translating between said SCCP parameter values recognizable by said ANSI based SS7 telecommunications network and SCCP parameter values recognizable by said CCITT based SS7 telecommunications network.

14. The system of claim 10 wherein said conversion module reformats data structure between said SCCP parameters recognizable by said ANSI based SS7 telecommunications network and said SCCP parameters recognizable by said CCITT based SS7 telecommunications network.

15. The system of claim 10 wherein said first SS7 network is connected to said second SS7 network via a gateway Signal Transfer Point (STP) and said signal includes a Calling Party Address (Cgpa) parameter containing a Cgpa value, and wherein said conversion module further comprises means for:

copying said Cgpa value into one of said SCCP parameters; and replacing said Cgpa parameter with a SS7 network based network address representing said gateway STP.

16. A method for transporting data transmitted between a first application module within an American National Standards Institute (ANSI) protocol based telecommunications network and a second application module within a Consultative Committee on International Telegraph and Telephone (CCITT) protocol based telecommunications network, said method comprising the steps of:

retrieving Signaling Connection Control Part (SCCP) parameters within a signal carrying said data transmitted by either application module;

converting a Called/Calling Party Address within said SCCP parameters between the ANSI and CCITT protocols; and transmitting said signal with said converted Called/Calling Party Address to the other application module.

17. The method of claim 16 wherein said step of converting said Called/Calling Party Address further comprises the step of converting between a Translation Type (TT) and Global Title Series (GTS) values recognizable by the ANSI protocol based telecommunications network and a TT, Numbering Plan (NP), Nature of Address indicator (NA), and GTS values recognizable by the CCITT protocol based telecommunications network.

18. The method of claim 16 wherein said step of converting said Called/Calling Party Address further comprises the step of converting between a Signaling Point Code (SPC) and Subsystem Number (SSN) values recognizable by the ANSI protocol based telecommunications network and a TT, Numbering Plan (NP), Nature of Address indicator (NA), and GTS values recognizable by the CCITT protocol based telecommunications network.

19. The method of claim 16 wherein said step of converting further comprises the step of reformatting between a data structure of said SCCP parameters recognizable by the ANSI protocol based telecommunications network and a data structure of said SCCP parameters recognizable by the CCITT protocol based telecommunications network.

20. The method of claim 16 wherein said ANSI protocol based telecommunications network is connected to said CCITT protocol based telecommunications network via a gateway Signal Transfer Point (STP) and said Calling Party Address is stored in first one of said SCCP parameters, and wherein said step of converting further comprises the steps of:

storing said Calling Party Address in a second one of said SCCP parameters; and storing a network address representing said gateway STP into said first one of said SCCP parameters.

21. A system for transporting data transmitted between a first application module within an American National Standards Institute (ANSI) protocol based telecommunications network and a second application module within a Consultative Committee on International Telegraph and Telephone (CCITT) protocol based telecommunications network, said system comprising:

means for retrieving Signaling Connection Control Part (SCCP) parameters from a signal carrying said data transmitted by either application module;

means for converting a Called/Calling Party Address within said SCCP parameters between the ANSI and CCITT protocols; and means for transmitting said signal with said converted Called/Calling Party Address to the other application module.

22. The system of claim 21 wherein said means for converting said Called/Calling Party Address further comprises the means for converting between a Translation Type (TT) and Global Title Series (GTS) values recognizable by said ANSI SS7 telecommunications network and a TT, Numbering Plan (NP), Nature of Address indicator (NA), and GTS values recognizable by said CCITT SS7 telecommunications network.

23. The system of claim 21 wherein said means for converting said Called/Calling Party Address further comprises the means for converting between a Signaling Point Code (SPC) and Subsystem Number (SSN) values recognizable by said ANSI SS7 telecommunications network and a TT, Numbering Plan (NP), Nature of Address indicator (NA), and GTS values recognizable by said CCITT SS7 telecommunications network.

24. The system of claim 21 wherein said ANSI protocol based telecommunications network is connected to said CCITT protocol based telecommunications network via a gateway Signal Transfer Point (STP) and said Calling Party Address is stored in first one of said SCCP parameters, and wherein said means for converting further comprises the means for:

storing said Calling Party Address into second one of said SCCP parameters; and storing said first one of said SCCP parameters with a network address representing said gateway STP.

* * * * *